United States Patent
Xia et al.

(10) Patent No.: US 8,214,884 B2
(45) Date of Patent: Jul. 3, 2012

(54) COMPUTER-BASED DYNAMIC SECURE NON-CACHED DELIVERY OF SECURITY CREDENTIALS SUCH AS DIGITALLY SIGNED CERTIFICATES OR KEYS

(75) Inventors: Sharon Xia, Bellevue, WA (US);
Eduardo Muñoz, Seattle, WA (US);
Dan Brombaugh, Seattle, WA (US)

(73) Assignee: Attachmate Corporation, Seattle, WA (US)

( * ) Notice: Subject to any disclaimer, the term of this patent is extended or adjusted under 35 U.S.C. 154(b) by 795 days.

(21) Appl. No.: 10/875,606

(22) Filed: Jun. 25, 2004

(65) Prior Publication Data

US 2004/0268152 A1  Dec. 30, 2004

Related U.S. Application Data

(60) Provisional application No. 60/482,871, filed on Jun. 27, 2003, provisional application No. 60/482,770, filed on Jun. 27, 2003.

(51) Int. Cl.
*G06F 21/00* (2006.01)
*G06F 7/04* (2006.01)
*G06F 15/16* (2006.01)
*G06F 17/30* (2006.01)
*H04L 29/06* (2006.01)

(52) U.S. Cl. .............. 726/5; 726/12; 726/18; 726/19; 726/20; 713/150; 713/151; 713/152; 713/153; 713/154; 713/155; 713/156; 713/176; 713/178; 713/180; 709/217; 709/218; 709/219; 709/225

(58) Field of Classification Search ............... 726/5, 12, 726/20, 18, 19; 713/150–156, 171, 176, 713/178, 180; 709/217–179, 225
See application file for complete search history.

(56) References Cited

U.S. PATENT DOCUMENTS

| | | | |
|---|---|---|---|
| 5,592,553 A * | 1/1997 | Guski et al. | 713/159 |
| 5,684,951 A | 11/1997 | Goldman et al. | |
| 5,689,638 A * | 11/1997 | Sadovsky | 726/21 |
| 5,706,349 A | 1/1998 | Aditham et al. | |
| 5,721,781 A | 2/1998 | Deo et al. | |
| 5,742,756 A | 4/1998 | Dillaway et al. | |
| 5,805,803 A | 9/1998 | Birrell et al. | |
| 5,850,451 A * | 12/1998 | Sudia | 380/286 |

(Continued)

OTHER PUBLICATIONS

Gilmore et al. "Secure Remote Access to an Internal Web Server." AT&T: 1999. http://www.isoc.org/isoc/conferences/ndss/99/proceedings/papers/gilmore.pdf.*

(Continued)

*Primary Examiner* — Christian LaForgia
*Assistant Examiner* — Kari Schmidt
(74) *Attorney, Agent, or Firm* — Nixon & Vanderhye P.C.

(57) ABSTRACT

A management server acts as a repository for a plurality of user certificates corresponding to a plurality of users. When a user wishes to access a remote computer such as a secure-enabled host requiring a secure credential, his/her computer sends a request message to the management server. The management server may perform its own validity checking. In response to a request and conditioned on the management server authorizing access to a computing resource that requires an authorization credential, the management server delivers the requested credential and executable code, the authorization credential comprising information that enables access to the computing resource and the delivered executable code manages the lifecycle of the delivered authorization credential by allowing only temporary storage without caching of the delivered authorization credential.

16 Claims, 6 Drawing Sheets

U.S. PATENT DOCUMENTS

| | | | |
|---|---|---|---|
| 5,907,621 | A | 5/1999 | Bachman et al. |
| 5,951,636 | A * | 9/1999 | Zerber .......................... 709/202 |
| 5,999,711 | A | 12/1999 | Misra et al. |
| 5,999,766 | A | 12/1999 | Hisatomi et al. |
| 6,012,066 | A | 1/2000 | Discount et al. |
| 6,041,357 | A | 3/2000 | Kunzelman et al. |
| 6,061,741 | A | 5/2000 | Murphy, Jr. et al. |
| 6,128,738 | A | 10/2000 | Doyle et al. |
| 6,134,658 | A | 10/2000 | Multerer et al. |
| 6,161,182 | A | 12/2000 | Nadooshan |
| 6,189,096 | B1 | 2/2001 | Haverty |
| 6,223,287 | B1 | 4/2001 | Douglas et al. |
| 6,253,248 | B1 | 6/2001 | Nakai et al. |
| 6,279,030 | B1 | 8/2001 | Britton et al. |
| 6,308,274 | B1 * | 10/2001 | Swift ................................ 726/9 |
| 6,324,683 | B1 | 11/2001 | Fuh et al. |
| 6,327,662 | B1 * | 12/2001 | Araujo .............................. 726/3 |
| 6,377,691 | B1 | 4/2002 | Swift et al. |
| 6,446,206 | B1 | 9/2002 | Feldbaum |
| 6,510,464 | B1 | 1/2003 | Grantges et al. |
| 6,766,454 | B1 * | 7/2004 | Riggins .......................... 713/185 |
| 6,996,841 | B2 * | 2/2006 | Kadyk et al. .................... 726/12 |
| 7,062,781 | B2 * | 6/2006 | Shambroom ................... 726/10 |
| 7,111,323 | B1 * | 9/2006 | Bhatia et al. ....................... 726/8 |
| 7,137,006 | B1 * | 11/2006 | Grandcolas et al. .......... 713/180 |
| 7,139,917 | B2 * | 11/2006 | Jablon ........................... 713/183 |
| 7,603,435 | B2 * | 10/2009 | Welingkar et al. ............ 709/217 |
| 7,707,405 | B1 * | 4/2010 | Gilman et al. ................. 713/156 |
| 7,793,342 | B1 * | 9/2010 | Ebrahimi et al. .................. 726/8 |
| 7,941,533 | B2 * | 5/2011 | Miller et al. ................... 709/225 |
| 2002/0031230 | A1 | 3/2002 | Sweet et al. |
| 2002/0157019 | A1 * | 10/2002 | Kadyk et al. .................. 713/201 |
| 2003/0028495 | A1 * | 2/2003 | Pallante ........................... 705/78 |
| 2003/0036999 | A1 * | 2/2003 | Mirlas et al. ..................... 705/40 |
| 2003/0196087 | A1 * | 10/2003 | Stringer et al. ............... 713/171 |
| 2004/0128502 | A1 * | 7/2004 | Royer ........................... 713/156 |
| 2004/0128546 | A1 | 7/2004 | Blakley, III et al. |
| 2004/0162786 | A1 | 8/2004 | Cross et al. |

OTHER PUBLICATIONS

Kohl, J., "RFC 1510—The Kerberos Network Authentication Service (V5)," 85 pages (Sep. 1993).
Microsoft TechNet, Article 313407, "How To: Create Automatic Certificate Requests with Group Policy in Windows," 2 pages (2003).
WRQ Reflection for the Web—Secure access inside and outside the firewall.
Dierks & Allen Standards Track Jan. 1999 The TLS Protocol Version 1.0 pp. 1-80.
Connected: An Internet Encyclopedia 14.34 Proxy Authorization http://www.freesoft.org/CIE/RFC/2068/195.htm.
Bertold Kolics, MTA-SzTAKI Bertold. Kolica@swztaki.hu Proxy Authentication with Squid.
Fielding et al, Standards Track, Network Working Group Hypertext Transfer Protocol—HTTP/1.1 J, Jun. 1999 pp. 1-176.
Warsaw barry@wooz.org [Zzope3-checkins]CVS: Zope3/lib/pthon/Zope/Security, Dec. 2002.
Thompson et al Proceedings of the 8th USENIX Security Symposium Aug. 1999 Certificate-Based Access Control for Widely Distributed Resources.
Jacobs Mitre Corp. USCINCPAC/J6 An Authorization Framework for Web-based Applications djacobs@mitre.org.
User Authentication and Authorization in a Networked Library pp. 3-10.
Rozmanov NTLM Authorization Proxy Server Nov. 2001.
Web proxy Server Information Page, pp. 1-12.
Understanding Cisco CNS Access Registrar HLR Proxy Server pp. 1-19, Oct. 2002.
Configuring the Cisco SIP Proxy Server pp. 1-37, Jan. 2003.
WRQ Reflection, Security Solutions.

* cited by examiner

COMPUTER-BASED DYNAMIC SECURE NON-CACHED DELIVERY OF SECURITY CREDENTIALS SUCH AS DIGITALLY SIGNED CERTIFICATES OR KEYS

CROSS-REFERENCE TO RELATED APPLICATIONS

This application claims priority from provisional application No. 60/482,770 filed Jun. 27, 2003 entitled "Computer-Based Secure Authorization System and Method Using Non-Cached Security Credentials Such As Digitally Signed Certificates" and provisional application No. 60/482,871 entitled "Computer-Based Dynamic Secure Non-Cached Delivery Of Security Credentials Such As Digitally Signed Certificates Or Keys.

This application is a continuation-in-part of application Ser. No. 10/421,948 filed Apr. 24, 2003 entitled "Proxy Server Security Token Authorization"; and is a continuation-in-part of application Ser. No. 09/524,272 entitled "Method and Apparatus For Distributing, Interpreting and Storing Heterogenous Certificates In A Homogenous Public Key Infrastructure." Each of these previously-filed cases is incorporated herein by reference as if expressly set forth.

FIELD

The technology herein generally relates to secure computing, and more particularly to authorization and permissions. Still more particularly, the technology herein relates to authorizing users to access a remote computer that challenges the users to present secure authorization credentials (e.g., certificates issued by a certifying authority) by dynamically delivering the secure credentials to the user on demand.

BACKGROUND AND SUMMARY

As we rely more and more on computers and computer networks, computing security becomes increasingly more important. We read in the newspaper about cyber criminals breaking into computers and computer networks and stealing critical information such as credit card and bank account information. We are always on the lookout for computer viruses that may attack and destroy information on our computers. Imagine the harm that could result if confidential computerized medical or personnel records are broken into and distributed over the Internet.

Much has been done to solve these problems. For example, tools have been developed that allow computers to communicate securely. In the context of the World Wide Web, a security protocol known as Secure Sockets Layer (SSL) provides both privacy (e.g., secrecy) and authentication (e.g., confidence that a computer's and/or user's asserted identity is true). The SSL technology has been built into most Internet browsers and web servers, and so has become widely available to protect electronic commerce and other sensitive communications.

The SSL protocol works by encrypting data passing between computers through use of encryption keys and associated encryption techniques. The SSL technology also provides secure authentication over a series of successive data exchanges. This authentication for example prevents an attacker from injecting his or her own computing device between already-communicating computers to intercept sensitive information and/or insert inauthentic information (e.g., substituting the attacker's own shipping address for that of a legitimate user) into the data stream being exchanged. See also a related Transport Layer Security (TLS) protocol that has become an Internet standard (RFC 2246). Other protocols such as for example SSH (Secure Shell) also exist.

Figure 1:
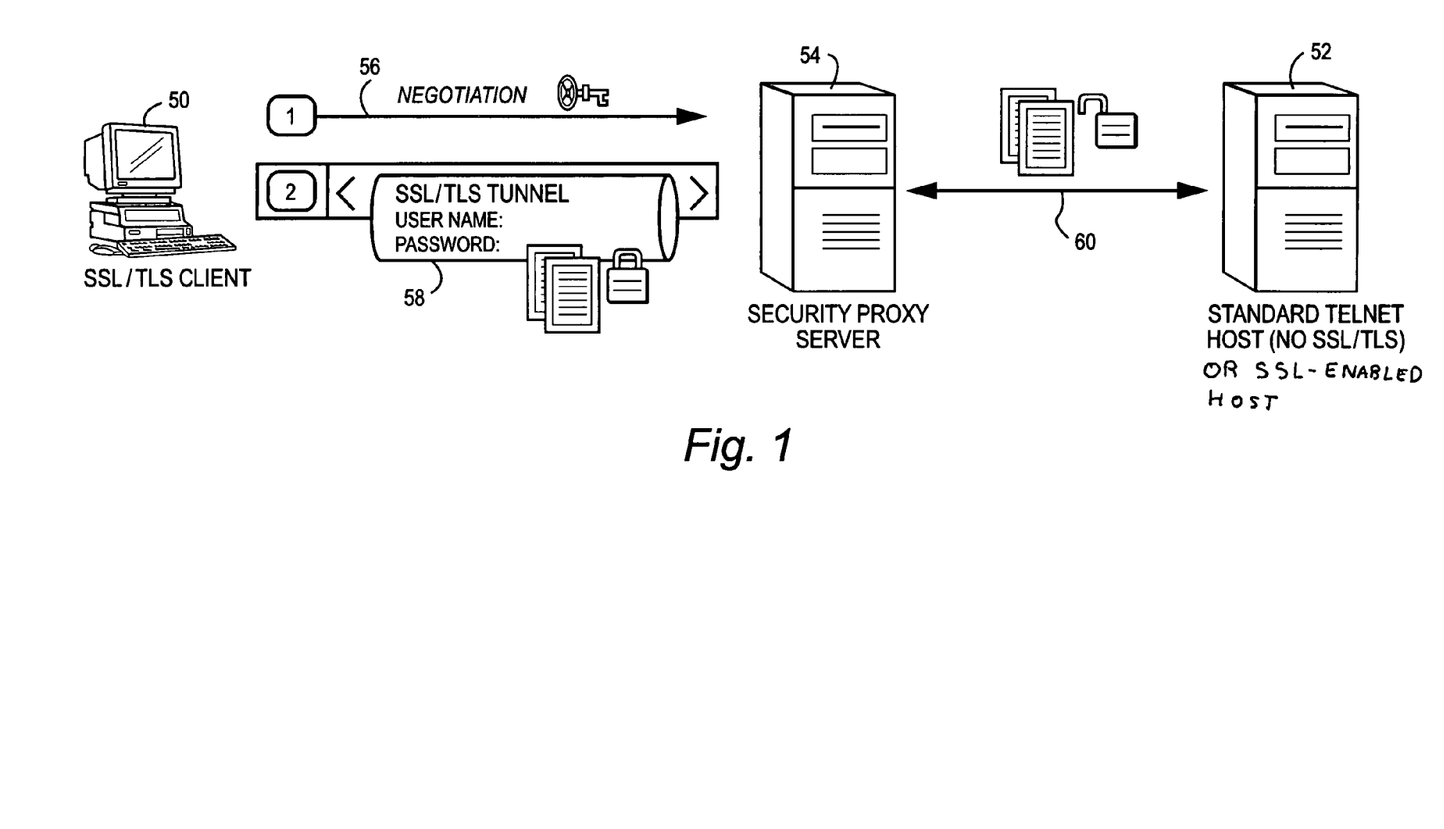
FIG. 1 shows an example communication between a user device and a computer or other resource through a security proxy server.

FIG. 1 shows an example use of such security protocols. In the illustrative example shown, a user operating an input-output device 50 wants to communicate with computer 52. The user's device 50 (which may be a so-called "client") has the SSL or TLS functionality in this particular example. The SSL or TLS functionality is used to create a secure session over which the user's device 50 may communicate with the remote computer 52. Such a secure session is generally protected by encryption so eavesdroppers and other attackers cannot listen in to or alter the data flow.

One of the functions provided by the SSL/TLS protocol is to permit the remote computer 52 to authenticate the user's device 50. This authentication generally works by the remote computer 52 challenging the user's device for a secure credential such as a digital certificate or a key. Generally, you can think of a digital certificate as the cyberspace equivalent of an identity card. Issued by a trusted "certifying authority", a digital certificate is generally thought of as an electronic credential that can be used to authenticate a user. See for example RFC2510 ("Internet X.509 Public Key Infrastructure Certificate Management Protocols") (March 1999) and other related IETF publications. However, a digital certificate is generally not considered to be the same thing as a credential. Generally, a certificate may not necessarily alone prove its authenticity. An analogy is a driver's license. A person could hold a stolen driver's license. In contrast, a credential is generally something that can prove its authenticity alone. For example, a signature that nobody can fake or steal may be considered a credential.

One example of a digital credential is a client private key and a client certificate for SSL/TLS client authentication to establish SSL/TLS connection between the client and a proxy server. The combination of the private key and certificate in this example case comprises the credential. The specific credential also covers the security token (see below) since the security token contains a server's signature and certificate. The combination of the server's signature and certificate proves its authenticity.

Digital certificates are now available from a variety of certifying authorities including commercial companies such as Verisign Inc. See for example Verisign's white paper "Establish Trust to Protect and Grow Your Online Business: Authentication and Encryption—The Cornerstones of Online Security". Some enterprises or networks have set up their own certifying authorities that issue certificates to authorized users within the enterprise or network.

Generally, SSL certificate authentication usually proceeds by having the certifying authority issue a digital certificate to the user's computer. For example, a user who wants a digital certificate can provide credit card, employee number or other identification information to the certifying authority (e.g., but inputting it into a web based form in some cases). The certifying authority typically checks this information to verify the user is who she says she is. Assuming the verification is correct, the certifying authority creates (using public key cryptography) a tamperproof digital certificate for the user. In some cases, the user can download the certificate or the secure credential onto her computer using a standard web browser (e.g., modern versions of Microsoft's Internet Explorer). Such browsers typically provide certificate management tools that allow users to import certificates into a certificate store on the computer's mass storage device. In other cases, a network administrator may physically visit the user's computer 50 to load the certificate onto the user's computer from a floppy diskette or the like.

Once the user's computer has access to an appropriate certificate, it is ready to create a secure (e.g., SSL) connection using certificate-based authentication. In setting up the secure connection, the remote computer 52 challenge's the user's computer 50 to authenticate itself. In response to the challenge, the user's computer 50 sends the secure credential (e.g., a certificate) to the remote computer 52. The remote computer 52 generally uses public key cryptography to validate the digital certificate. Two-way authentication is also possible, i.e., the user's computer 50 can also challenge the remote computer 52 to produce a certificate which the user's computer authenticates. Once the certificate(s) have been validated, the user and remote computers 50, 52 can proceed to establish a secure two-way SSL or other communications session.

The SSL authentication protocol works quite well to provide a reasonable level of security for most commercial, e-commerce, corporate and other transactions. But just as in many secure protocols, secure credential distribution and management is a non-trivial problem. For example, digital certificates are often or usually subject to expiration. Typical digital certificates downloaded from Verisign for example may expire after one year. Furthermore, any digital certificate or other credential which is believed to have been compromised must be immediately canceled so that the authenticating server or other remote computer 52 will not validate it. Canceling or revoking a previously-issued secure credential may also be desired in view of changed circumstances (e.g., when an employee leaves an enterprise or is transferred to a different part of the enterprise, when the composition of a work group changes, etc.). Distributing and maintaining, in a secure way, a valid, appropriate set of digital credentials for a large user community can require substantial time, effort and resources.

Briefly, the illustrative technology herein relates to a first server delivering a credential dynamically to a client after the client has been authenticated and authorized by first server; and the client then using the credential to authenticate itself to a second sever for establishing a secure connection (communication) between the client and second server. In illustrative exemplary implementations described herein, the first server dynamically delivers this client credential to the authenticated/authorized client without caching the credential on client's machine.

The technology herein can be used to deploy secure credentials including but not limited to digital certificates in a secure manner to provide higher levels of security and control than in some other previous arrangements. In one exemplary non-limiting illustrative arrangement, a management server acts as a repository for a plurality of user certificates corresponding to a plurality of users. When a user wishes to access a remote computer such as a secure-enabled host requiring a secure credential, the user controls her computer to send a request message to the management server. The management server may perform its own validity checking (e.g., based on password protection, directory information including user authorization, or a variety of other techniques). Once the management server is satisfied that the requesting user is authorized to access the secure host or other remote computer 52, the management server sends the user the necessary secure credential. This can be over an insecure or secure connection.

Once the management server is satisfied that the requesting user is authorized to access the secure host or other remote computer, the management server sends the user the necessary secure credential in a manner that is on demand (in other words, at the time the client certificate or key pair is needed to complete the connection to another server and not before); is secure during transmission; and is provided in a manner which prevents the client from using the client certificate or key pair to commence a new session to the SSL or SSH hosts after the User's session with server A has ended. In one example arrangement, the user's computer does not persistently store the secure credential but rather maintains the secure credential in volatile memory such as for example random access memory or other memory that will be reliable erased (e.g., by overwriting with other information).

Once the user computer has received the secure credential, it can proceed to attempt to establish a secure connection with the secure-enabled host or other remote computer. Upon receiving a challenge or at some other appropriate time, the user computer may present the secure credential to the host or other remote computer for validation. Once the host or other remote computer validates the secure credential and is thus satisfied that the user computer is authorized for access, the host or other remote computer may proceed to establish a secure connection with the user computer using a conventional security protocol such as SSL, TLS, SSH, etc. In the exemplary, illustrative non-limiting example, the user computer then erases the secure credential after it has been used. Erasure may be accomplished in a variety of ways such as for example overwriting a hard disk sector with random information, commanding a random access memory to erase parts of its contents, etc.

In the example illustrative technology disclosed herein, the secure credential may be any form of secure credential. Examples include an SSL digital certificate in any conventional format (e.g., PKCS #12, PKCS #7, PKI, Microsoft Serialized Certificate Store, or any other standard or non-standardized format). Such digital certificates may, for example, include a digital signature that a certifying authority signs using a private key. Other examples of secure credentials include digital signatures signed by other than a certifying authority, private keys, secure tokens or other authorizations, etc.

By not storing the secure credential persistently on the user computer as in many prior arrangements, the exemplary, non-limiting illustrative technology herein avoids the potential problem of certificate theft. In some prior systems, access to a user's computer is all that is needed for an attacker to make a copy of the user's certificate of other secure credential. Many users leave their computers on all the time without signing off. Any attacker could access the user's computer and make an illicit copy of the secure credentials which the attacker could then transfer to a different computer—thus allowing the attacker to act as an imposter for the real user and engage in secure communications without the consent or participation of the real user.

Another non-limiting advantage of the exemplary technology disclosed herein is minimizing the time, effort and resources needed to maintain and distribute secure credentials. Because secure credentials for a user pool may all be maintained on a management server rather than being distributed throughout a user community with the management server supplying users with secure credentials on demand on a just-in-time basis, a network administrator or other authority can more easily maintain the universe of secure credentials without having to access each individual user computer. This simplifies secure credential distribution and maintenance without substantially increasing complexity.

In some exemplary arrangements herein, the user computer may persistently store the secure credential instead of immediately erasing it after use. Such storage could be on a permanent basis or for a more limited time. In this mode of operation, the management server would be used to simplify the distribution of secure credentials to a user community by providing authorized users with necessary secure credentials on demand. If a previously supplied secure credential expired or was canceled, the user's computer could again contact the management server to request a replacement credential. This persistent storage technique has some disadvantages as compared to the technique in which secure credentials are immediately erased after use, but may also have certain advantages in terms of minimizing traffic to the management server and reducing delay time in establishing secure connections.

In one exemplary illustrative non-limiting arrangement, the user computer may be executing a terminal emulation application and attempting to access a secure-protocol-enabled host computer that requires a certificate before it will establish a secure communications session. The technology herein can supply the user computer terminal emulation application with an appropriate certificate on demand when needed, but may also condition supply of the secure credential on performing its own authorization check (e.g., by confirming in a user or other directory that the requesting user is authorized to access the particular host computer). This technique is compatible with existing technology such as the public key infrastructure and conventional certifying authorities so it does not require, in at least one non-limiting aspect, any widespread change to existing deployed host computers or other such arrangements.

BRIEF DESCRIPTION OF THE DRAWINGS

These and other features and advantages are better and more completely understood by referring to the following detailed description of presently preferred exemplary illustrative non-limiting implementations in conjunction with the drawings, of which.

DETAILED DESCRIPTION

Figure 2:
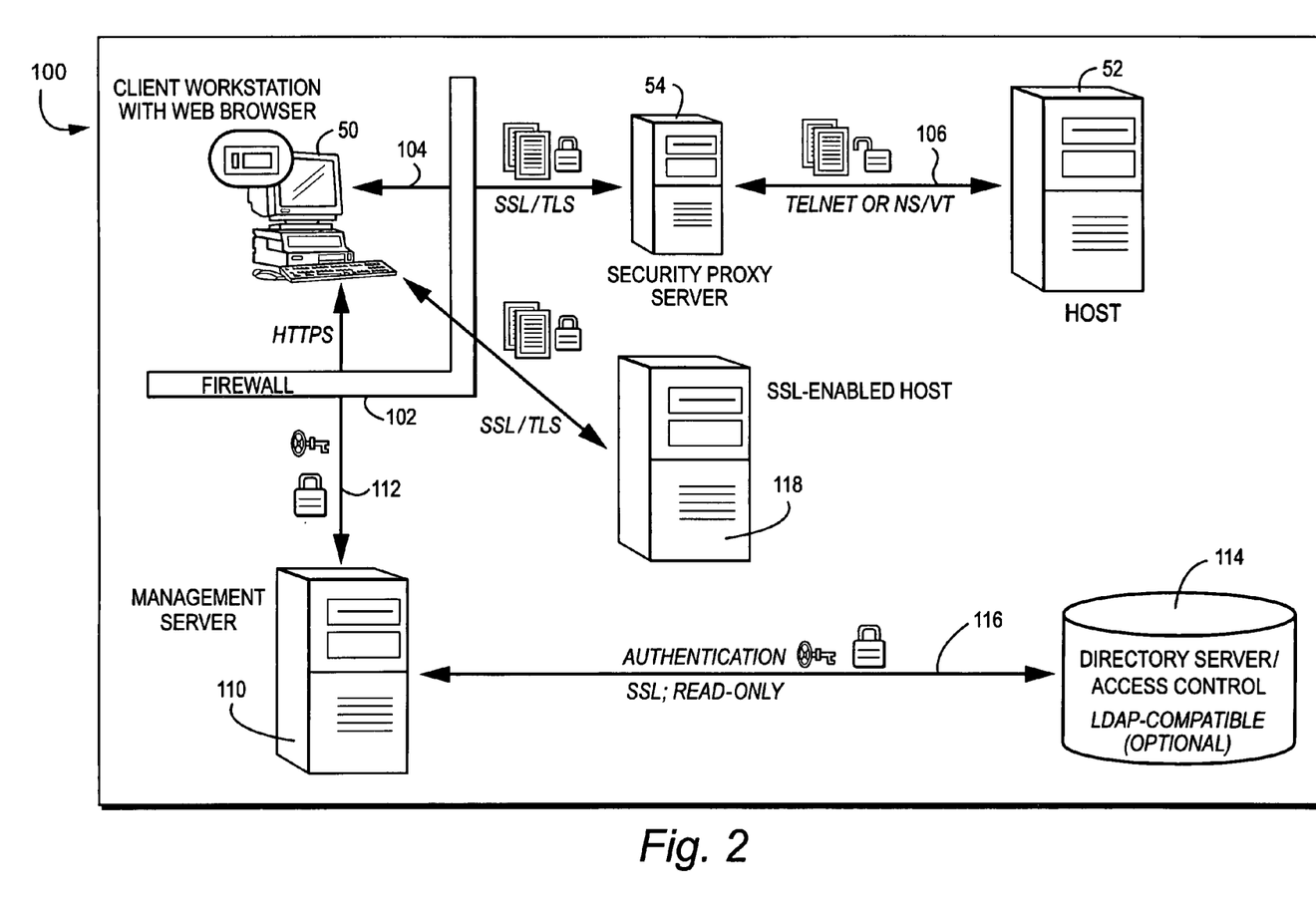
FIG. 2 shows an exemplary illustrative computing network including a management server that mints authorization tokens for examination by the security proxy server.

FIG. 2 shows an example overall non-limiting secure computing arrangement 100. Computing arrangement 100 includes a user or client device 50 that wishes to communicate with a computer 52 or other computing resource. The user device 50 may be any sort of device including a data entry means and a display means. Examples include a personal computer workstation with World Wide Web browser running Microsoft Windows, Macintosh, Linux, Unix or any other suitable operating system, a web-enabled cellular telephone, personal data assistant, entertainment device, or any other networked computing device. Computer 52 may be any computing or networked resource. In one specific non-limiting example, computer 52 comprises a so-called "legacy" host computer such as a mini computer or main frame computer (e.g., an IBM or other main frame, an AS/400 or other midsize computer, a Unix host, an Open VMS host, Hpe3000, or any other environment).

As discussed in connection with FIG. 1, user device 50 communicates with computer 52 through a security proxy server 54. In the particular example shown, the user device 50 is located outside of a firewall 102, and may be connected to the security proxy server 54 via any convenient networking or other data communications arrangement including for example the Internet, a Virtual Private Network (VPN), a wireless network or connection, a local area or wide area network, or any other desirable data communications link. In the exemplary arrangement shown, a suitable conventional secure protocol is used to provide privacy and authentication for the communications between user device 50 and security proxy server 54 occurring over link 104. In one exemplary arrangement, the SSL/TLS protocol may be used but other implementations may use additional and/or different security protocol arrangements depending upon a particular need and other circumstances.

In the example shown, the security proxy server 54 communicates within the firewall 102 with computer 52 over an additional data link 106. Data link 106 can but need not be protected (e.g., with encryption) depending upon the particular circumstances (e.g., physical security may be adequate to protect the data being communicated over the link). In the general case, there will be multiple user devices 50 communicating with security proxy server 54 and/or security proxy server 54 may be communicating with many different computers 52 or other computing resources.

As also shown in FIG. 2, the user device 50 may communicate with any number of additional computers 118 some of which may be capable of secure (e.g., SSL/TLS or other) communications. In such case, security proxy server 54 may not need to be placed between user device 50 and computer 118, although additional policy management and other authorization functionality can be provided by the security proxy server 54 even if computer 118 could maintain a secure session with user device 50 without use of the security proxy server.

System 100 in the exemplary illustrative implementation also includes a management server 110. Management server 110 in the exemplary non-limiting arrangement shown manages communications between user device 50 and computer 52 by communicating with the user device 50. Management server 110 does this by issuing authorization tokens to user device 50 that can be authenticated by security proxy server 54 and used to guide or control the permissions that the security proxy server grants to the user device. In this particular instance, the user device 50 is not trusted at least because it is outside of firewall 102. In the exemplary implementation, management server 110 generates or provides security credentials such as for example SSL digital certificates, SSH keys and authorization tokens which it supplies to the user device 50. Security proxy server 54 will not allow the user device 50 to access computer 52 or other computing resources without an unexpired, appropriate security credential.

In the exemplary implementation, management server 110 dynamically supplies such security credentials to user device 50 over a secure link 112 that passes outside of firewall 102. In the example shown, a secure communications protocol (e.g., HTTPS) of conventional nature is used to protect link 112 and to authenticate user device 50 to the management server 110 so the management server can be assured it is not providing the credential to an attacker or other unauthorized user. As part of this secure protocol, user device 50 may be required to prove it is authentic (e.g., by providing a password, a certificate, etc.). Management server 110 in this example issues credentials only to authentic users.

Management server 110 also has access to a conventional directory server 114 providing access control and authorization information (e.g., via conventional LDAP or other directory services) to determine which authorizations to grant to particular user devices 50. Management server 110 in this illustrative example communicates with directory server 114 via a secure (e.g., SSL-protected) data link 116 within firewall 102.

In one example non-limiting implementation, management server 110 may comprise a "Reflection for the Web" (RWeb) management server installed on a conventional web server computer. An application server such as Tomcat or Websphere may be used. User device 50 may provide a conventional web browser that supports JAVA or other applet technology—these applets being used to provide host or other emulation functionality in this particular example. The security proxy server 54 is placed, in the exemplary arrangement, in the same sub-net behind the same firewall 102 as computer 52. Data between the security proxy server 54 and computer 52 are not encrypted in this particular example. In this example, only one port needs to be opened on the firewall 102 between the user device 50 and the security proxy server 54 for clients 50 to connect with multiple computing devices 52 from their web browsers. In the illustrative non-limiting example shown, the communications between the user device 50 and the management server 110 is HTTPS, although other secure communications protocols could be used instead. In the illustrative non-limiting example shown, the communication between the user device 50 and the security proxy server 54 is SSL/TLS over TCP/IP although other secure protocols and transport protocols may be used in other applications as desired.

Exemplary Secure On-Demand Token Arrangement

Figure 3:
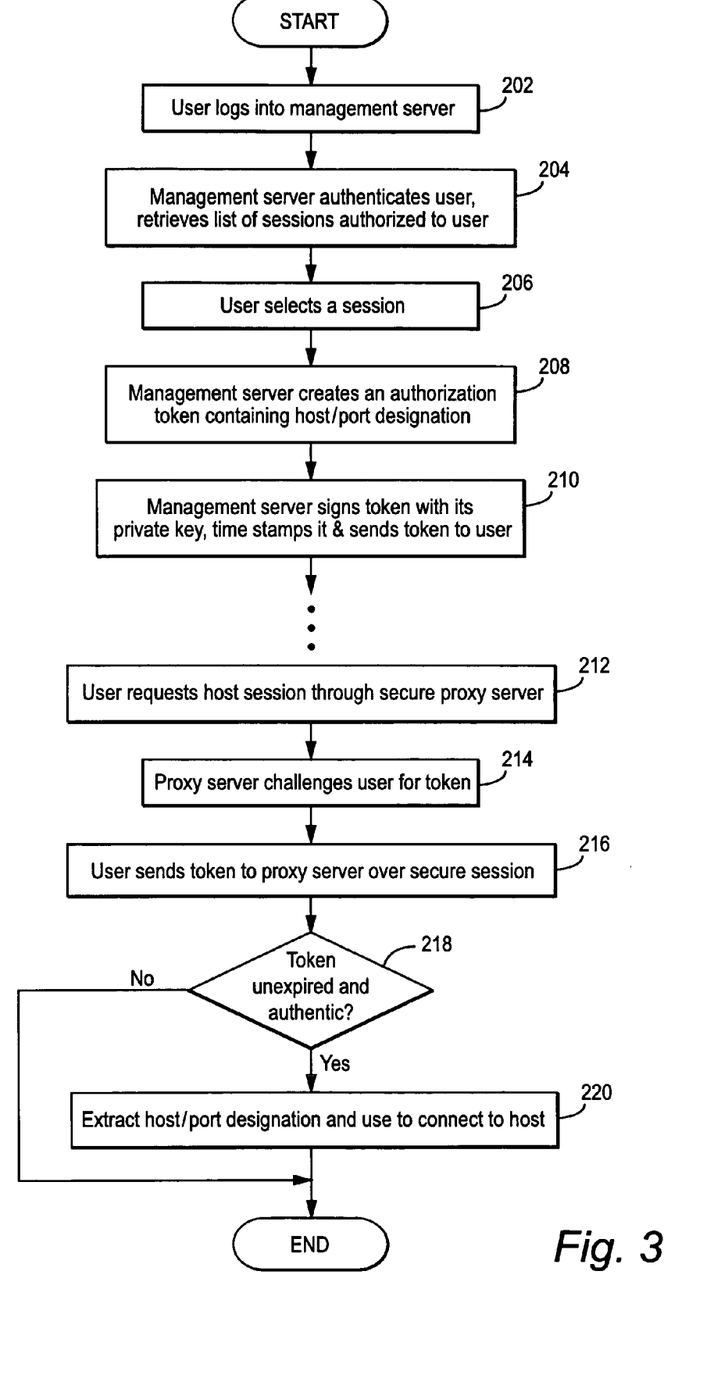
FIG. 3 shows an exemplary non-limiting illustrative process.

FIG. 3 shows an example non-limiting flow chart of illustrative non-limiting steps performed within the FIG. 2 system 100. In the example shown, a user at user device 50 directs his or her web browser to management server 110 in order to log into the management server (FIG. 3, block 202). The management server 110 first authenticates the user (FIG. 3, block 204). Management server 110 may perform this user authentication in a way that depends upon the particular access control model. For example, if the exemplary arrangement uses LDAP, the management server 110 may authenticate the user with an LDAP user name/password. If desired, the user device 50 may present a digital certificate or other credential so management server 110 can be assured that the user device 50 is authenticate.

Once the management server 110 has determined who is operating user device 50 and is satisfied that the user and associated device are authenticate, it may retrieve a list of sessions and authorizations that the user device 50 and/or its associated user is authorized to access (FIG. 3, block 204). In one example implementation, the management server 110 sends to the user device 50 a list of authorized sessions or other resources. For example, the management server 110 may send a "links list" in HTML or other format listing the sessions or other computing resources that the user is authorized to access. In such a case, the user may select a link from the "links list" for use in a secure session (FIG. 3, block 206).

Figure 4:
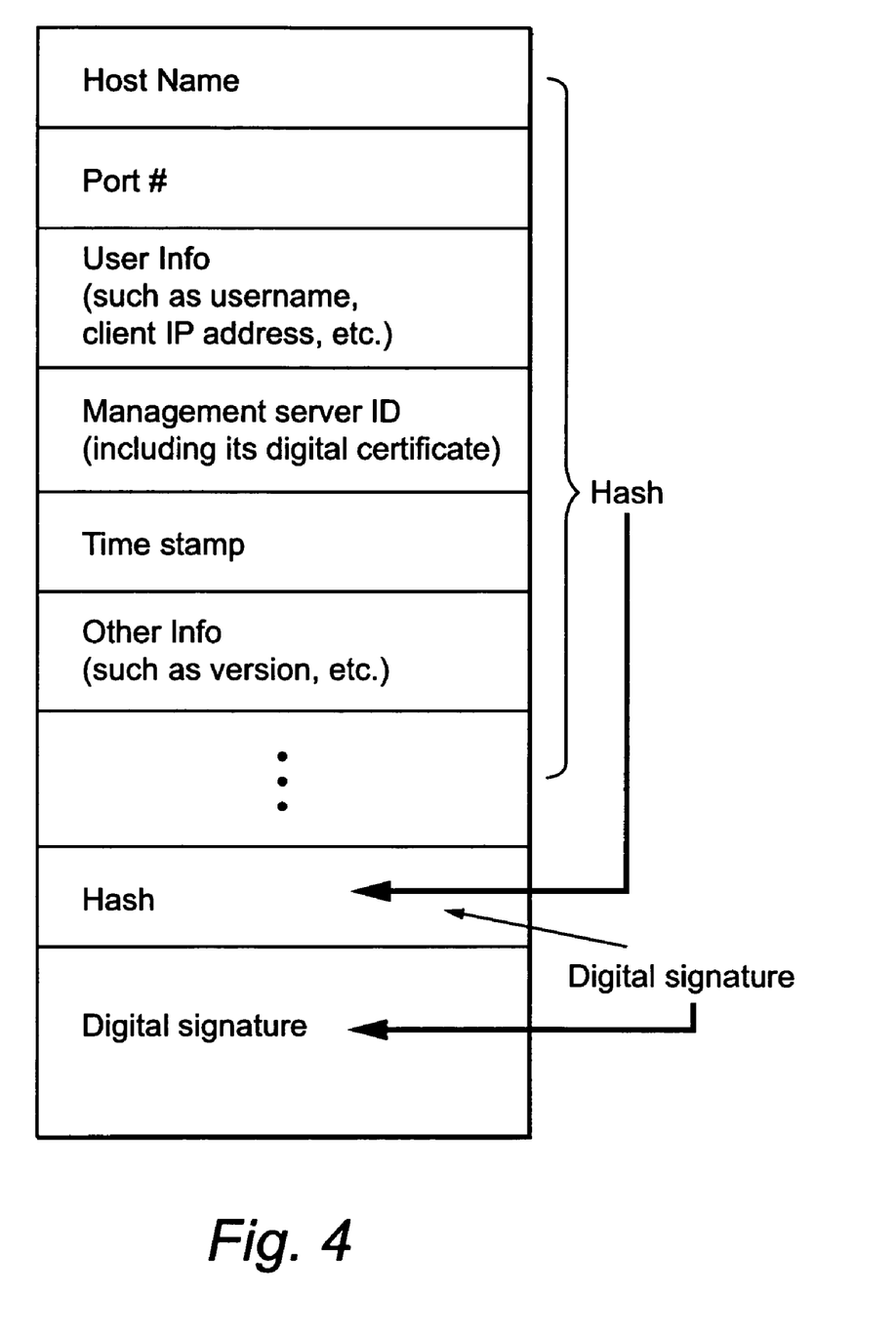
FIG. 4 shows an exemplary illustrative non-limiting authorization token data structure.

In a particular example shown, the management server may respond by sending user device 50 HTML or XML including or referencing a particular page, command, emulator applet or other functionality that user device 50 should begin executing, following or using in order to activate the secure session with proxy server 54. In the example shown, the management server 110 also sends to user device 50 an "authorization token" (FIG. 3, block 208). In this particular non-limiting example, the authorization token (an example of which is shown in more detail in FIG. 4) may contain the authorized computer 52 name and port number as well as other information. In the example shown, the authorization token is preferably digitally signed with the management server 110's private key. The token is preferably also time stamped and/or provided explicitly or implicitly with a particular finite expiration date and time. See FIG. 3, block 210. As shown in FIG. 4, the token's digital signature may include a hash message digest which ensures the data is not tampered with. The hash is digitally signed by the management server using its private key. This digital signature proves the token was issued by the management server.

In the non-limiting example shown, the user device 50 connects to the security proxy server 54 via link 104. For example, the user device 50 and security proxy server 54 may begin a standard SSL/TLS handshake. Both SSL server and client may be authenticated by its peer in the exemplary arrangement to provide additional security above the normal arrangement where client authentication is optional (in this case it is the user device 50 that is not trusted by the security proxy server 54). In the example shown, once the user device 50 has authenticated the security proxy server 54 and the security proxy server 54 has authenticated the user device 50, the security proxy server challenges the user device 50 for the authorization token (FIG. 3, block 214). The user device 50 responds to this challenge by sending the encrypted authorization token to the security proxy server 54 (FIG. 3, block 216). The security proxy server 54 verifies that the authorization token is signed by the management server 110, and also verifies that the authorization token has not been tampered with and is not expired. If the security proxy server 54 determines that the authorization token is unexpired and is authenticate ("yes" exit to FIG. 3 decision block 218), the proxy server extracts the computer name and port number from the authorization token and uses this information to connect to the designated computer 52 via the appropriate port (FIG. 3, block 220). If, on the other hand, the security proxy server 54 determines that the token is not authentic and/or has expired ("no" exit to FIG. 3 decision block 218), the security proxy server 54 declines to establish any connection with computer 52.

Once the security proxy server 54 establishes a connection with computer 52, it functions as a conventional proxy server by passing through data communications between the computer 52 and user device 50.

While the standard SSL/TLS (RFC 2246) security protocol generally does not support authorization, the security proxy server 54 in the exemplary non-limiting implementation adds authorization functionality by verifying, examining and acting in response to an authorization token created by management server 110. Such an authorization token authorizes a user to access a specific system 52 in the exemplary illustrative implementation. The authorization token contains authorized computer information and user information in the illustrative implementation. It is digitally signed using the private key of the management server 110 and is time stamped. The authorization token is transferred from management server 110 to user device 50 over secure link 112 and from the user device 50 to the security proxy server 54 over secure link 104. The authorization token proves that the user device 50 and/or the associated user is authorized by the management server 110 to access the computer 52 indicated in the authorization token.

The authorization token and/or the way it is transferred hides the information identifying computer 52 and techniques for accessing it. An attacker outside of firewall 102 may learn the name and port number of the security proxy server 54, but in this particular example it cannot obtain the information needed for accessing computer 52 such as host name and port number. An attacker cannot get through the security proxy server 54 without a valid authorization token. The authorization token also may contain authorized user information used for logging by the security proxy server 54. An administrator can configure the authorization token valid or expiration time period to prevent the authorization token from being reused later—for using the user device 50 to obtain a new authorization token from management server 110.

Example Secure On-Demand Delivery of Other Secure Credential

Briefly, in one example implementation, the user device 50 authenticates to management server 110 and thus commences a session on management server 110. The user device 50 then runs a Client (e.g., a terminal emulator applet) that needs a client certificate to log on to an SSL host or a key pair to log on to an SSH host 118. In the exemplary implementation, the management server 110 provides the client certificate or key pair to Client in a manner that:
- is on demand (in other words, at the time the client certificate or key pair is needed to complete the connection to another server, and not before).
- is secure during transmission, and
- is provided in a manner which prevents the Client from using the client certificate or key pair to commence a new session to the SSL or SSH hosts after the User's session with server A has ended.

In more detail, an administrator creates an account for User on the management server 110. The Administrator also configures management server so that User is authorized to run a terminal session—which means downloading a terminal emulator applet from the management server 110 and using it to connect to a particular host. The Administrator also stores on the management server 110 the SSL client certificate or SSH user keys needed to connect to that host.

The User device 50 logs into the management server 110. The User then runs the terminal session. This causes the terminal emulator applet to be downloaded from the management server to the User's machine. The terminal emulator applet then attempts to open a connection to the SSL or SSH host.

During the SSL or SSH handshake, the host requests an SSL client certificate or an SSH user key from the terminal emulator applet. The applet first checks to see if it has a client certificate or user key stored locally. If the applet has a locally stored client certificate or user key, then it uses it. But if it doesn't, then it requests the client certificate or user key from the management server. The management server 110 verifies that the User still has a valid session open on the management server. The management server 110 then delivers the client certificate or user key to the applet over a secure connection. If the applet disconnects from the SSL or SSH host and needs to reconnect, it has to request the SSL client certificate or SSH key from the management server again, and will only receive it if it still has a valid session open on the management server.

Figure 5:
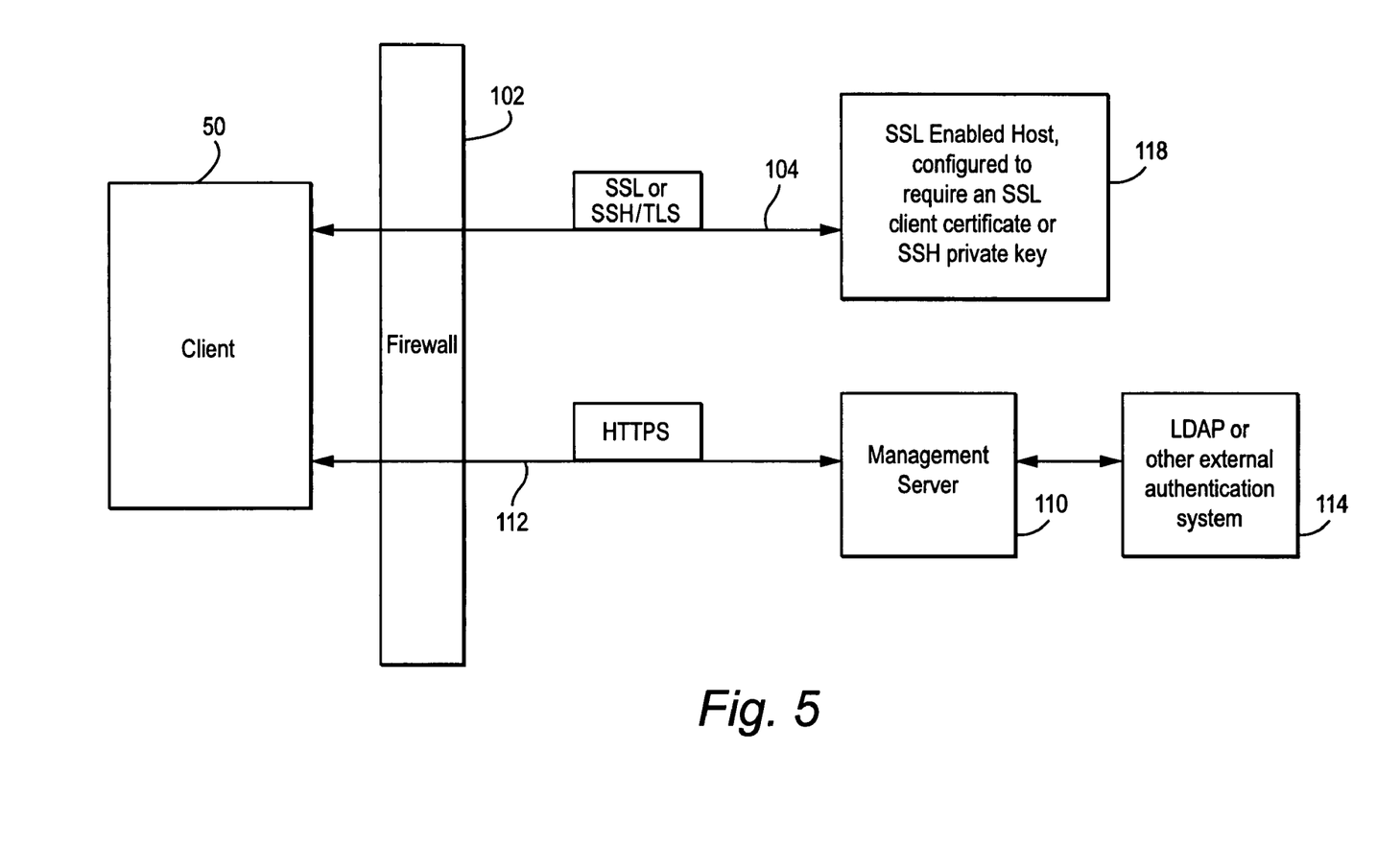
FIG. 5 shows an exemplary illustrative non-limiting authentication system.
Figure 6:
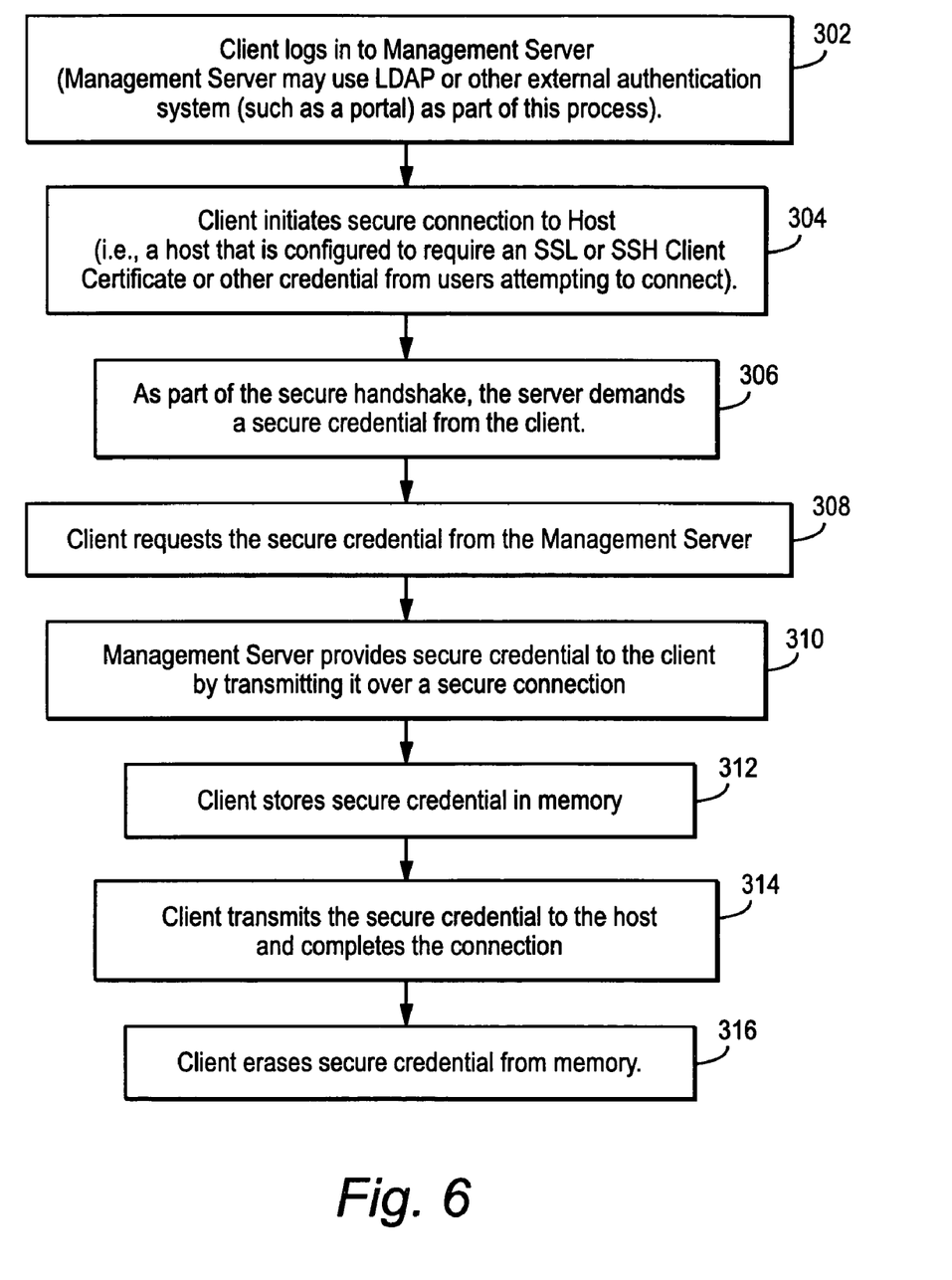
FIG. 6 shows an exemplary illustrative non-limiting authentication process.

FIG. 5 shows an example simplified diagram of portions of FIG. 2 and FIG. 6 shows an example corresponding illustrative secure process. In the FIG. 6 non-limiting illustrative example, client 50 logs into management server 110 (FIG. 6, block 302). Management server 110 may, for example, use LDAP or any other external authentication system (e.g., a portal) as part of this process to authenticate the client 50 (FIG. 6, block 302). The client 50 then initiates a secure (e.g., SSL/TSL, SSH or other) connection to remote computer 52 such as, for example, an SSL/TSL, SSH or other enabled host computer 118 (FIG. 6, block 304). In the example illustrative arrangement shown, host 118 is of a type that is configured to require an SSL/TSL or SSH client certificate of other secure credential from users attempting to connect. As part of the secure handshake, the host 118 other remote computer 52 demands a secure credential from client 50 (FIG. 6, block 306). In this illustrative example, the client 50 does not persistently store the secure credential and does not yet even have it. Rather, client 50 requests the secure credential (e.g., an SSL certificate issued by a certifying authority, a private key, or other secure credential) from the management server 110 (FIG. 6, block 308). In response to this request, the management server 110 provides the secure credential to the client 50 by transmitting it over a secure connection 112 (for example, using HTTPS or other secure protocol) (FIG. 6, block 310).

Once the client 50 receives the secure credential from the management server 110 over secure connection 112, it stores the secure credential in its memory (FIG. 6, block 312). The client 50 then transmits the secure credential to the host 118 to satisfy the host challenge for the secure credential (FIG. 6, block 314). Other conventional authentication/validation processes may be performed to complete the secure connection between client 50 and host 118. In the exemplary arrangement, the client 50 now or at some future point erases the secure credential from its memory so it is no longer available on the client device 50 (FIG. 6, block 316).

As mentioned above, the secure credential can be an SSL client certificate, an SSH private key, or any other secure credential. In one exemplary illustrative implementation, the secure credential is issued by a certifying authority and is thus part of a chain of trust—which enables the host 118 to independently verify that it is valid. While the exemplary illustrative arrangement described above erases the secure credential at the client 50 as soon as it is used, in other example arrangements, the client 50 may maintain the secure credential for a limited or even unlimited amount of time.

Note that management server 110 as part of FIG. 6, block 302 may use any of a variety of different authenticating techniques to authenticate the client 50 as a condition to sending the client the secure credential. For example, the management server 110 may exercise policy management to selectively provide or withhold secure credentials to different users based on a variety of different factors including for example time, date, directory validation, network loading, or nay other desired criteria.

Illustrative Non-Limiting Example

A particular exemplary illustrative non-limiting example use scenario for the arrangement described above can make use of a management server component that runs as a servlet on the web server. The web server delivers the applet when the user's browser requests it. The applet makes a non-secure or secure (e.g., HTTP or HTTPS) connection to the management server and requests two certificate stores: trusted Certificate Authority root certificates, and other trusted certificates that may be specific to the enterprise, organization, etc. (these may be considered to be a single logical certificate store comprising the certificate verification chain). These stores can in some circumstances be saved locally once they have been delivered by the management server.

When the applet wishes to make an SSL/TLS connection to another server, such as a proxy server or a host system, it receives the server's public key certificate from the server itself as part of the TLS negotiation. This credential may be verified using the previously stored certificate chain, establishing the authenticity of the server.

At this point, the management server can also, as described above, deliver a client credential to the applet—in which case it performs some authentication of the client that it does not perform when delivering the other certificate stores.

All documents cited above are incorporated herein by reference.

The invention is not to be limited to the disclosure, but on the contrary, is intended to cover various modifications and equivalent arrangements included within the scope of the claims.

We claim:

1. A method for establishing an authorized communication over a network with a computing resource comprising:
   providing a management server to manage and exercise computing resource access control, the management server delivering a requested authorization credential and executable code for execution;
   in response to a request and conditioned on the management server authorizing access to a computing resource that requires an authorization credential, the management server delivering the requested authorization credential and said executable code over the network, said authorization credential comprising information that enables access to the computing resource, said delivered executable code managing the lifecycle of the delivered authorization credential by allowing only temporary storage without caching of the delivered authorization credential;
   the delivered and temporarily stored non-cached authorization credential being structured to allow authorization of a communication session with the computing resource, and
   the delivered executable code structured to establish a communication session with the computing resource and automatically erase the temporarily stored non-cached authorization credential once it is no longer needed for an established communication session so as to prevent the delivered instance of the temporarily-stored authorization credential from being used to commence a further secure communication session after the established session ends.

2. The method of claim 1 wherein the delivered executable code comprises a terminal emulation applet which the management server delivers on demand.

3. The method of claim 1 wherein said authorization credential comprises a public/private key pair including a client authentication certificate.

4. The method of claim 1 wherein using the delivered non-cached authorization credential comprises transmitting said authorization credential to a host computing resource to satisfy a challenge from the host.

5. The method of claim 1 wherein said executable code automatically deletes the delivered authorization credential from memory of a client computer without requiring any user operation to cause deletion so the authorization credential is no longer available at the client computer.

6. The method of claim 1 wherein the credential is part of a chain of trust within a public key infrastructure.

7. The method of claim 1 wherein the authorization credential is structured to enable the computing resource to independently verify that the authorization credential is valid without having to communicate with the management server.

8. At least one non-transitory storage medium storing instructions that control the operation of a client computer for establishing a secure communication over a network with a computing resource, said stored instructions for execution by a client computer providing:
   first stored instructions that at least in part establish secure communications between the client computer and a credential management server and thereby permit said management server to authenticate a user of the client computer and to deliver over the network to the client computer a secure credential and executable instruction code to manage and exercise resource access control;
   second stored instructions that enable the client computer to dynamically receive the executable instruction code and the secure credential over the network from the management server conditioned on authentication and authorization of the user for access to a session with a resource that will need a secure credential, said received instruction code allowing the client computer to use but only temporarily store the secure credential only in volatile memory;
   third stored instructions that initiate a secure communication with the resource and present the delivered secure credential to the resource to be authenticated for access to a session; and
   fourth stored instructions comprising at least a portion of the executable instruction code received from the server that automatically erase or disable the temporarily stored secure credential once it is no longer needed for maintaining an established authorized secure communication session with the resource.

9. A method for implementing secure digital communication over a network between a client computer and a computer resource that requires a credential for authentication of an access-requesting entity, comprising:
   sending a request for on-demand provision of a credential;
   receiving a credential and executable code over the network, the code configured to allow only temporary storage of the credential;
   using the executable code to initiate a secure communication session with the resource and to prevent the client computer from caching or preserving the temporarily-stored credential in a manner that disables use of the cached credential once it is no longer needed for a secure digital communication session; and
   presenting the temporarily-stored credential to the computer resource to thereby enable the computer resource to authenticate the access-requesting entity and authorize access by the client computer to the computer resource.

10. The method of claim 9 further including establishing a secure communication session between the client computer and the computer resource at least in part in response to authentication by said computer resource based upon the presented credential.

11. The method of claim 9 further including establishing a secure communication session between the client computer and the computer resource server without the management server communicating with the computer resource server.

12. The method of claim 9 wherein the executable code is an applet.

13. The method of claim 9 wherein the executable code is a browser plug-in.

14. The method of claim 9 wherein the credential comprises a public/private key pair including a client authentication certificate.

15. A system for implementing control over digital communications over a network between a client computer and an entity requesting a credential for authentication and access to a computer resource, comprising:

a credential management server providing on-demand delivery of a credential to said client computer to be used for access by the client computer to said resource, the management server configured to authenticate and check authorization of the client computer and, upon verifying authorization, providing over the network a client certificate or other secure credential along with executable code to said client computer, the executable code configured to initiate a secure communication to the resource and allow only temporary storage and usage of the credential by the client computer for establishing and maintaining an authorized communication session with the computer resource and then erasing or corrupting the credential, wherein the executable code must be used by the client computer to connect via the network to a particular computer resource and, once executed, prevents the client computer from permanently caching or preserving the credential once it is no longer needed for the established authorized communication.

16. A method for use with a browser for providing digital communication over a communications network between a user's computer and a resource that requires a credential for authentication, the method comprising:

requesting a credential from a credential-managing computer entity;

upon authentication and authorization of the user's computer by the credential managing computer entity, receiving an applet over the network from the credential managing computer entity;

executing the applet at the browser, the applet execution managing the lifecycle of a credential that the resource requires for authentication and access, wherein the executed applet autonomously requests the credential from the managing computer entity and, upon receiving the credential, initiates a secure connection to the resource and forces the received credential to be erased after the credential is no longer being used for maintaining an authorized communication session between the resource and the user's computer and prevents persistent or permanent storage of the received credential at the user's computer.

* * * * *